United States Patent
Belwal et al.

(10) Patent No.: US 11,832,155 B1
(45) Date of Patent: Nov. 28, 2023

(54) CONSISTENT POLICY ENFORCEMENT ACROSS NETWORKS

(71) Applicant: T-Mobile Innovations LLC, Overland Park, KS (US)

(72) Inventors: Deepesh Belwal, Ashburn, VA (US); Anuj Sharma, Broadlands, VA (US); Lei Zhu, Overland Park, KS (US); Elaheh Moayer, McLean, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 343 days.

(21) Appl. No.: 17/345,120

(22) Filed: Jun. 11, 2021

(51) Int. Cl.
*H04W 4/50* (2018.01)

(52) U.S. Cl.
CPC ..................... *H04W 4/50* (2018.02)

(58) Field of Classification Search
CPC ............... H04W 4/50; H04W 28/0827; H04W 28/0846
See application file for complete search history.

(56) References Cited

U.S. PATENT DOCUMENTS

| 2009/0017815 A1* | 1/2009 | Takeda | H04W 8/04 455/422.1 |
| 2012/0110128 A1* | 5/2012 | Aaron | H04L 65/1069 709/219 |
| 2015/0019746 A1* | 1/2015 | Shatzkamer | H04W 76/10 709/228 |

FOREIGN PATENT DOCUMENTS

| WO | WO-2018035741 A1 * | 3/2018 | ......... H04L 41/0893 |
| WO | WO-2021134365 A1 * | 7/2021 | ............ H04W 76/19 |

* cited by examiner

*Primary Examiner* — Joseph E Dean, Jr.
(74) *Attorney, Agent, or Firm* — SHOOK, HARDY & BACON L.L.P.

(57) ABSTRACT

Systems and methods are provided for consistent policy enforcement across networks. A subscription is provisioned at a first network with an initial service policy. The first network queries a second network for updated service policy information. In response to the query, updated service policy information for the subscription is received. The updated service policy information is determined by the second network based on a selection criteria attribute for the subscription satisfying selection criteria. The selection criteria attribute is unavailable at the first network. Service is provided to a device associated with the subscription in accordance with the updated service policy information.

20 Claims, 6 Drawing Sheets

CONSISTENT POLICY ENFORCEMENT ACROSS NETWORKS

SUMMARY

The present disclosure is directed, in part, to enabling consistent policy enforcement based on selection criteria attributes across different networks, including networks that do not have access to the selection criteria attributes. When selection criteria attributes are available at one network node, but not at another network node, the latter network node may query the former network node using a subscription identifier that is common to both nodes and receive the relevant policy associated with that subscription. The latter network node may then enforce the policy for that subscription without reference to the initial selection criteria attributes. Accordingly, aspects of the technology described herein enable a network node to enforce a policy that is based on selection criteria attributes, even when the selection criteria attributes are unavailable to the network node. This improves the functioning of a network node by enabling it to enforce a policy without referencing the selection criteria attributes underlying the policy. This also facilitates consistent policy enforcement across different networks, and thus improves network interoperability.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached figures, which are intended to be exemplary and non-limiting, wherein.

DETAILED DESCRIPTION

The technology of the present disclosure is described with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The technology described herein provides for consistent policy enforcement based on selection criteria attributes across different networks, including networks that do not have access to the selection criteria attributes. When selection criteria attributes are available at one network node, but not at another network node, the latter network node may query the former network node using a subscription identifier that is common to both nodes and receive the relevant policy associated with that subscription. The latter network node may then enforce the policy for that subscription without reference to the initial selection criteria attributes.

By way of background, network nodes utilize policies to determine aspects of services that are to be provided to mobile devices. The policies may define a type of service, a level of service, and/or another aspect of service that is to be provided for a specific subscription and the mobile devices associated with such subscription. It is desirable for different nodes to enforce the same service policy and thus provide consistent service across different networks. Challenges arise, however, when networks of different technology types (e.g., 3G, 4G, 5G, LTE, CDMA, GSM, Wi-Fi) or different versions or configurations of networks are involved, and the criteria utilized to identify subscriptions that are subject to a particular service policy are available on certain networks, but unavailable on others.

For example, a network operator may upgrade a network from one technology type to another. The transition period between network technologies, where an operator must maintain multiple networks and provide consistent service across networks, can be costly and can interfere with customer experience if not executed successfully. The operator may gradually roll out services on the new network to a select group of subscribers. In one instance, the operator might enable data access over its 5G networks to subscriptions that have 5G capabilities. If successful, the operator might then stop data access over its LTE networks for those same subscriptions. The 5G network may accommodate the identification of subscriptions that have 5G capabilities; for example, a database field in the 5G network may include attributes corresponding to 5G capabilities, and such selection criteria attributes may thus be available on that network. Accordingly, the 5G network node may identify the subscriptions that satisfy the selection criteria (i.e. subscriptions that have 5G capabilities) and update a database to reflect that those subscriptions are to receive data access over the 5G networks, but not over the LTE networks. The LTE network, on the other hand, may not have access to information regarding 5G capabilities of subscriptions, or, in other words, this selection criteria attribute may be unavailable on the LTE network. Nonetheless, it is desirable to identify the relevant subscriptions at the LTE network in order to stop data access over the LTE network for those subscriptions.

The technology described herein provides solutions to this challenge. In an exemplary aspect, a subscription identifier utilized by both the 5G and LTE networks is determined (e.g., IMSI, GUTI, SUPI, SUCI, MSISDN). The LTE network node uses the common subscription identifier to query the 5G network node, and the 5G network node responds with the policy associated with that subscription identifier. The LTE network node updates a database to reflect that this particular subscription is to receive data access over the 5G networks, but not over the LTE networks. The LTE network node may then enforce the policy (e.g., not permit data access over the LTE network), without ever referencing the initial selection criteria attributes (e.g., whether the subscription has 5G capabilities). Thus, the technology described herein provides consistent policy enforcement based on selection criteria attributes across different networks, including networks that do not have access to the selection criteria attributes.

Conventional solutions to the challenges described above have numerous shortcomings. Some approaches may result in different policies being applied in different networks. For example, if no action is taken to enforce a new policy at the network node that lacks access to the selection criteria attributes, then that node may enforce a different policy. In the context of the example above, if no action is taken to cause the LTE network node not to permit data access over the LTE network, then the LTE network node and the 5G network node will be enforcing different policies. This may cause inconsistent, disrupted, and/or lower quality service, which may impair functioning of the network, as well as user experience.

Another approach is to update a network provisioning system and a provisioning interface on the network nodes lacking access to the selection criteria attributes. The selection criteria attributes may then be populated at the relevant network nodes, and the network nodes may then identify the relevant subscriptions and enforce the appropriate policies. In the context of the example above, a network provisioning system and the provisioning interface associated with the LTE network node may be updated, and the selection criteria attributes regarding 5G capabilities may be populated so that the LTE network node can apply the selection criteria and identify subscriptions having 5G capabilities. A shortcoming of this solution is that it requires updating the network provisioning system and the provisioning interface of the network node in order to populate the selection criteria attributes to the network node. This requires extensive programming and is time consuming and expensive. Furthermore, the process of backfilling existing subscriptions (in addition to new subscriptions at the time of provisioning) poses additional challenges. For example, the selection criteria attributes for all existing subscriptions must be populated at the relevant network node. Accordingly, conventional solutions have numerous shortcomings.

Aspects of the technology described herein solve the problems described above by enabling a network node to enforce a policy that is based on selection criteria attributes, even when the selection criteria attributes are unavailable to the network node. Thus, the present solution improves the functioning of a network node by enabling it to enforce a policy without referencing the selection criteria attributes underlying the policy. Additionally, the technology described herein facilitates consistent policy enforcement across different networks, and thus also improves the interoperability among different networks.

The present solution addresses numerous shortcomings of conventional solutions. For example, the programming requirements for communicating data (e.g., policy information for a particular subscriber) between two network nodes, as in the present solution, are less burdensome than the programming requirements for updating a network provisioning system and a provisioning interface at a network node to populate selection criteria attributes at the relevant network node, as in conventional solutions. Communicating policy information between two network nodes, as in aspects of the present technology, may be accomplished with existing interfaces that utilize standard access technologies, such as LDAP, HTTP, or HTTP2. Even if no such interface exists, the process for developing such an interface is substantially easier than the process for populating selection criteria attributes at the relevant network node, as is required in conventional solutions. Thus, the present solution reduces development and deployment time and cost. Furthermore, the present solution facilitates backfilling existing subscriptions with the new policy. Just as two nodes can communicate policy information associated with certain subscription identifiers at the time of provisioning a new subscription, the two nodes can similarly communicate policy information associated with existing subscriptions.

The benefits provided by the present technology are advantageous in numerous contexts. One exemplary context is an upgrade of a network from an older technology type to a newer technology type. Using aspects of the technology described herein, the old network can be configured to enforce a particular policy during the transition period (i.e. until the old network is closed) without investing the resources required to populate selection criteria attributes at a node that is nearly obsolete and is going to be closed in the near future. An operator can roll out access to the upgraded network to successive groups of subscriptions and, in parallel, stop their access to the old network using aspects of the policy enforcement disclosed herein. When all subscriptions have been moved to the new network, the old network may be shut down. This ensures the shutdown does not impede quality of service for any subscriptions.

As demonstrated by the preceding discussion, the technology described herein provides specific improvements to telecommunications networks and components thereof, and provides numerous benefits over conventional solutions.

A first aspect of the present disclosure is directed to a system that includes one or more processors and one or more computer storage devices storing computer-usable instructions that, when used by the processor, cause the processor to perform various operations. These operations include determining a first identifier that identifies a subscription in a database of a first network node and that corresponds to a second identifier that identifies the subscription in a database of a second network node. Additionally, a query is communicated from the first network node to the second network node. The query includes a request for service policy information and includes at least one of the first identifier or the second identifier. The first network node receives service policy information for the subscription in response to the query. The service policy information is determined by the second network node based on a selection criteria attribute that is unavailable at the first network node. The operations further include, at the first network node, providing service to a device associated with the subscription in accordance with the service policy information.

A second aspect of the present disclosure is directed to a computerized method for consistent policy enforcement across networks. The steps of the method may be performed at a first network. The method includes provisioning a subscription with an initial service policy. The method further includes, after a predefined amount of time has elapsed since provisioning the subscription, querying a second network for updated service policy information. The query includes a subscription identifier. In response to the query, updated service policy information for the subscription is received. The updated service policy information is determined by the second network based on a selection criteria attribute for the subscription satisfying selection criteria. The selection criteria attribute is unavailable at the first network. The method further includes providing service to a device associated with the subscription in accordance with the updated service policy information.

A third aspect of the present disclosure is directed to a computerized method performed at a network node in a first network. The method includes determining a first identifier that identifies a subscription in the first network and that corresponds to a second identifier that identifies the subscription in a second network. A query is communicated to the second network. The query includes at least one of the first identifier or the second identifier. In response to the query, service policy information for the subscription is received. The service policy information is determined by the second network based on a selection criteria attribute that is unavailable at the first network. Service is provided to a device associated with the subscription in accordance with the service policy information.

Various technical terms are used throughout this description. An illustrative resource that fleshes out various aspects of these terms can be found in Newton's Telecom Dictionary, 31st Edition (2018).

Embodiments of the technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices, and any other medium which may be used to store the desired information and which may be accessed by the computing device 600 shown in FIG. 6. These memory components can store data momentarily, temporarily, or permanently. Computer-storage media does not comprise a signal per se.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Figure 1:
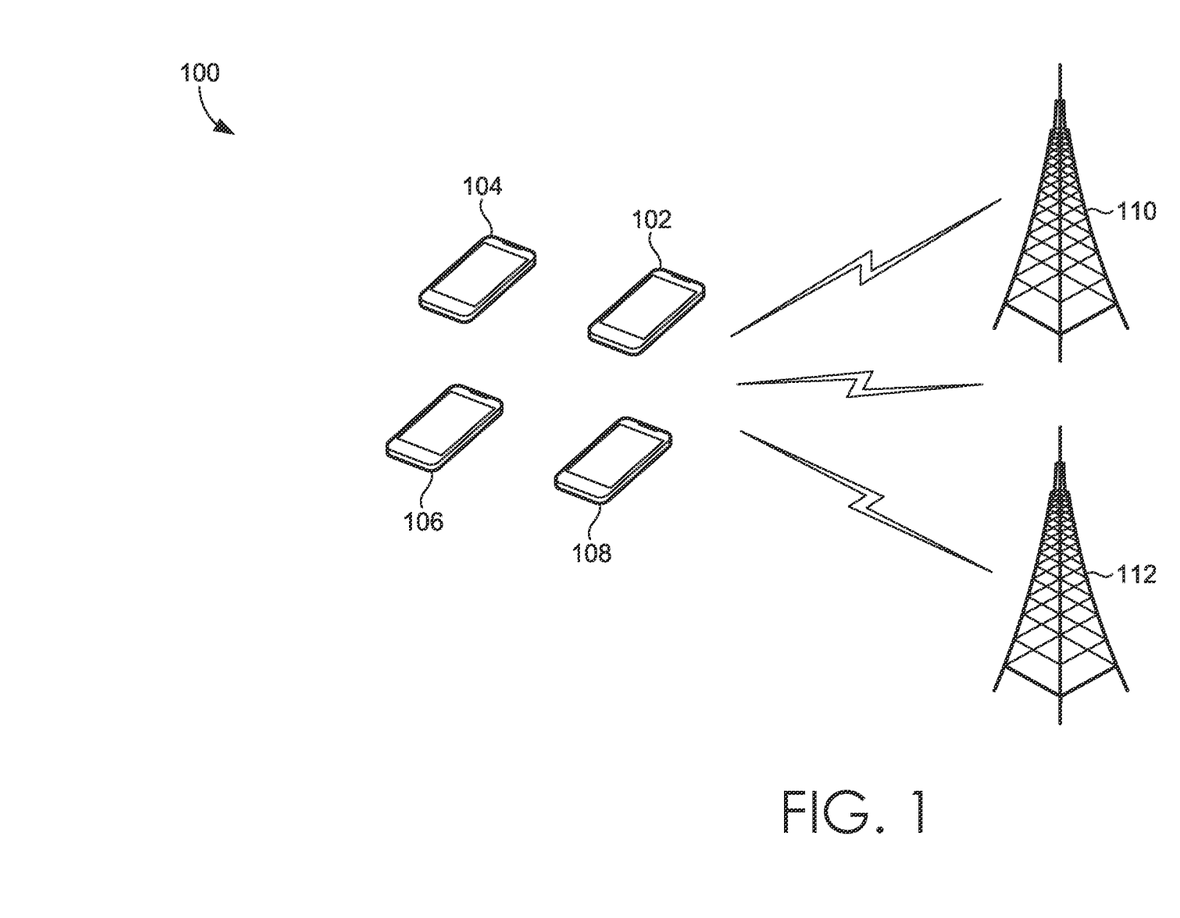
FIG. 1 is a diagram of an exemplary system suitable for implementing aspects of the technology described herein.

Turning now to the drawings, FIG. 1 depicts a diagram of an exemplary network environment 100 suitable for use in implementations of the present disclosure. Such a network environment is illustrated and designated generally as network environment 100. Network environment 100 is but one example of a suitable network environment and is not intended to suggest any limitation as to the scope of use or functionality of the technology described herein. Neither should the network environment be interpreted as having any dependency or requirement relating to any one or combination of components illustrated. The number, interaction, and physical location of components illustrated in FIG. 1 are examples, as other methods, hardware, software, components, and devices for establishing one or more communication links between the various components may be utilized. The components may be connected in various manners, hardwired or wireless, and may use intermediary components that have been omitted or not included in FIG. 1 for simplicity's sake. As such, the absence of components from FIG. 1 should not be interpreted to exclude additional components and/or combinations of components. Moreover, though components may be represented as singular components or may be represented in a particular quantity in FIG. 1, it will be appreciated that some aspects may include a plurality of devices and/or components such that FIG. 1 should not be considered as limiting the quantity of any device and/or component.

The network environment 100 provides service to one or more mobile devices 102, 104, 106, and 108. The network environment 100 may be a telecommunication network (e.g., a wireless telecommunication network), or portion thereof. The network environment 100 may include an array of devices and components, such as base stations, servers, switches, relays, amplifiers, databases, nodes, and others, some of which are not shown. The devices and components may form network environments similar to what is shown in FIG. 1, may perform methods in accordance with the present disclosure, and may provide connectivity in various implementations. The network environment 100 may include a single network, multiple networks, or a network of networks, but is shown in a simplified form in FIG. 1 so as not to obscure aspects of the technology described herein.

The network environment 100 can be part of a telecommunication network that connects subscribers to a service provider. The network environment 100 may be associated with a telecommunications provider that provides services (e.g., voice, data, SMS) to mobile devices, such as mobile devices 102, 104, 106, and 108. For example, the network may provide voice and non-voice services, including SMS, and/or data services to user devices or corresponding users that are registered or subscribed to utilize the services provided by a telecommunications provider. The network environment 100 may be any communication network, such as those providing voice and/or data services, including, for example, a 1× circuit voice, a 3G network (e.g., CDMA, CDMA2000, WCDMA, GSM, UMTS), a 4G network (e.g., WiMAX, LTE, HSDPA, LTE Advanced), a 5G network, a Wi-Fi network, or any other communication network.

The network environment 100 may include or otherwise may be accessible through network nodes 110 and 112. Each of nodes 110 and 112 may be configured to communicate with mobile devices, such as mobile devices 102, 104, 106, and 108, located within the geographical area, or cell, covered by the one or more antennas of the respective node. The nodes may include one or more antennas, base transmitter stations, radios, transmitter/receivers, digital signal processors, control electronics, GPS equipment, power cabinets or power supply, base stations, charging stations, and other components such that the nodes 110 and 112 may provide a communication link between the one or more mobile devices 102, 104, 106, and 108 and other components, systems, equipment, and/or devices of the network environment 100.

Mobile devices 102, 104, 106, and 108 may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these devices, or any other device (such as the computing device 600) that communicates via wireless communications with a network node in order to interact with a public or private network.

Figure 6:
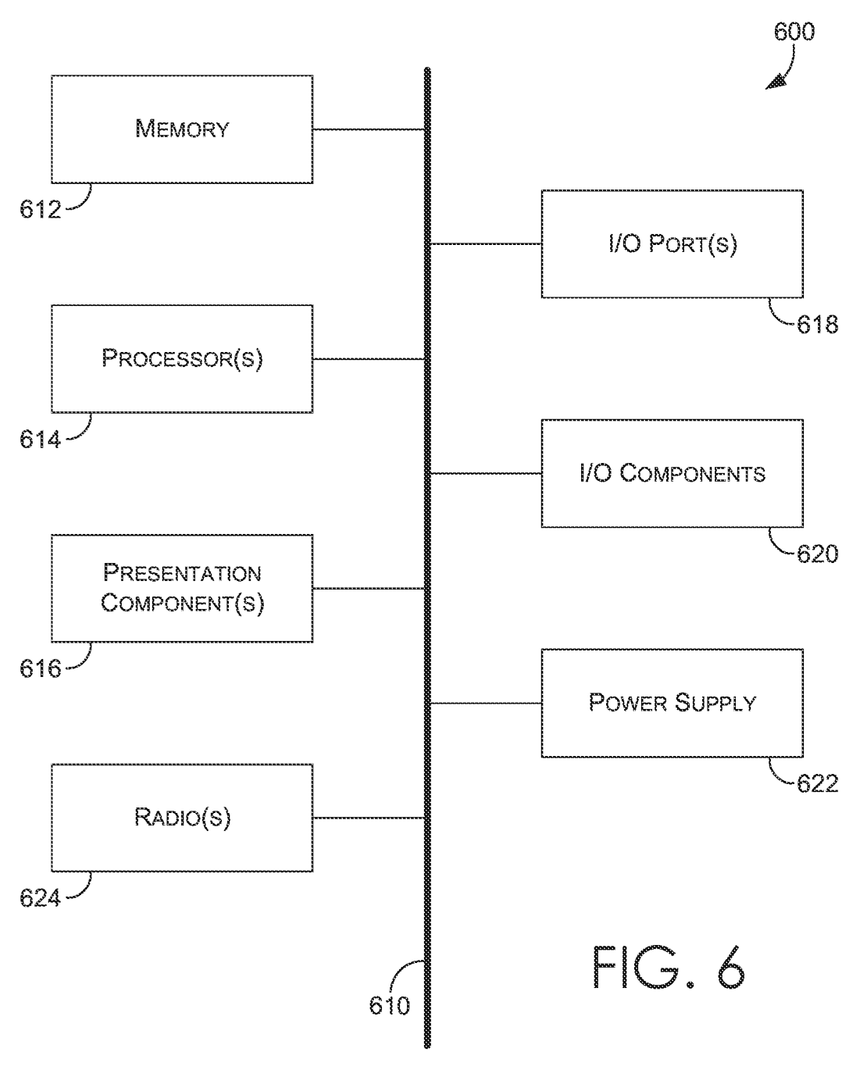
FIG. 6 is a block diagram of an exemplary computing environment suitable for implementing aspects of the technology described herein.

In some aspects, mobile devices 102, 104, 106, and 108 may correspond to computing device 600 in FIG. 6. Thus, a mobile device can include, for example, a display, power source (e.g., battery), data store, speaker, memory, buffer, radio, and the like. In some implementations, a mobile device (such as mobile devices 102, 104, 106, and 108) comprises a wireless or mobile device with which a wireless telecommunication networks can be utilized for communication (e.g., voice and/or data communication). In this regard, the mobile device can be any computing device that communicates by way of a wireless network, for example, a 1× circuit voice, a 3G network (e.g., CDMA, CDMA2000, WCDMA, GSM, UMTS), a 4G network (e.g., WiMAX, LTE, HSDPA, LTE Advanced), a 5G network, a Wi-Fi network, or any other communication network.

Figure 2:
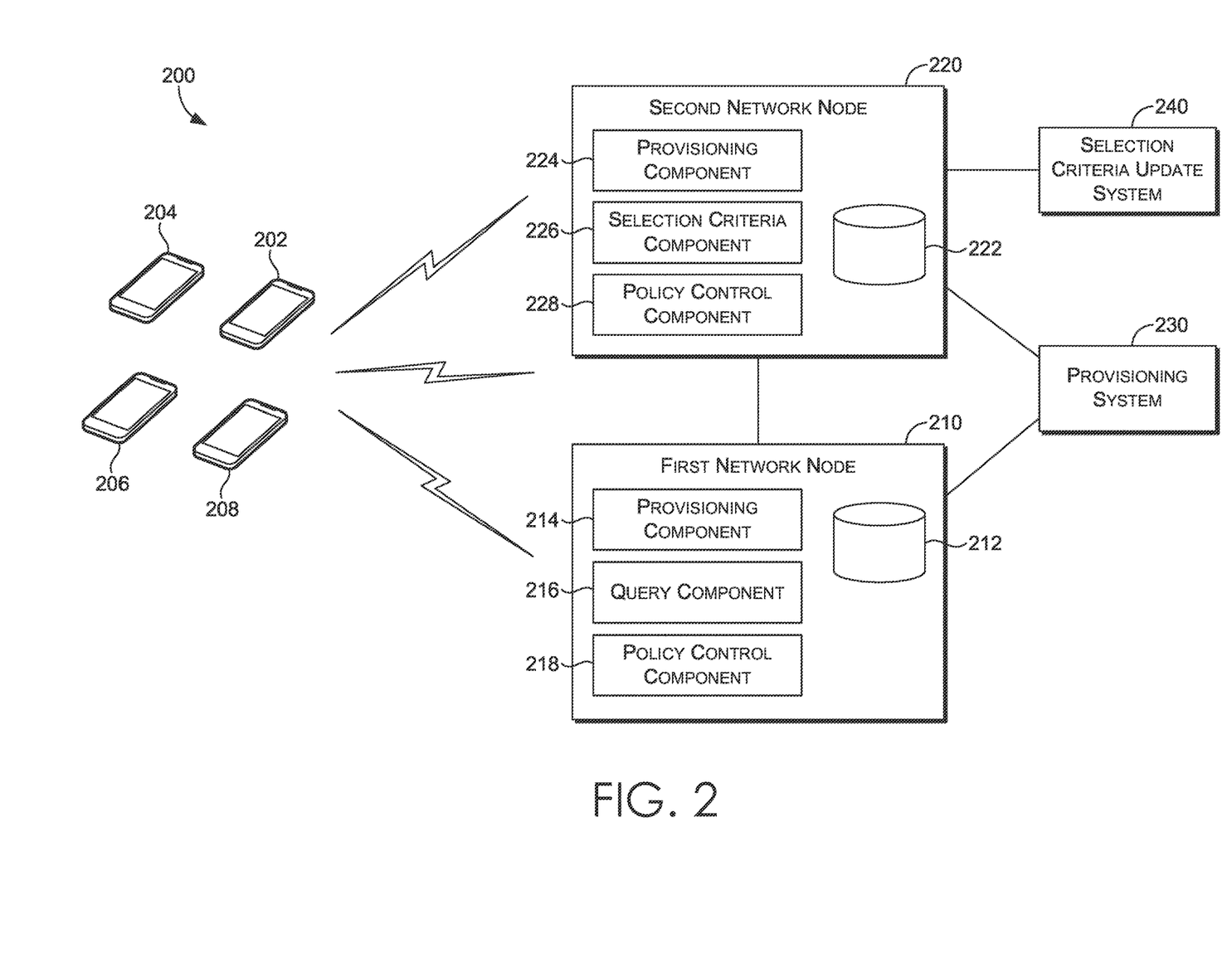
FIG. 2 is a diagram of an exemplary system suitable for implementing aspects of the technology described herein.

Turning now to FIG. 2, a diagram is provided of the network environment 200 (e.g., a telecommunication network such as, but not limited to, a wireless telecommunication network), which is suitable for implementing aspects of the technology described herein. Network environment 200 is but one example of a suitable network environment and is not intended to suggest any limitation as to the scope of use or functionality of the technology described herein. Neither should the network environment be interpreted as having any dependency or requirement relating to any one or combination of components illustrated. The number, interaction, and physical location of components illustrated in FIG. 2 are examples, as other methods, hardware, software, components, and devices for establishing one or more communication links between the various components may be utilized. The components may be connected in various manners, hardwired or wireless, and may use intermediary components that have been omitted or not included in FIG. 2 for simplicity's sake. As such, the absence of components from FIG. 2 should not be interpreted to exclude additional components and/or combinations of components. Moreover, though components may be represented as singular components or may be represented in a particular quantity in FIG. 2, it will be appreciated that some aspects may include a plurality of devices and/or components such that FIG. 2 should not be considered as limiting the quantity of any device and/or component.

The network environment 200 includes a plurality of mobile devices 202, 204, 206, and 208; a first network node 210; a second network node 220; a provisioning system 230, and a selection criteria update system 240. Network environment 200 may share features similar to those discussed with respect to network environment 100. For example, mobile devices 202, 204, 206, and 208 may be similar to mobile devices 102, 104, 106, and 108; the first and second network nodes 210 and 220 may be similar to network nodes 110 and 112; and the network environment 200 may be similar to the network environment 100. Thus, features discussed above with respect to FIG. 1 may also apply to FIG. 2. For example, network environment 200 may be a network of networks, with each of nodes 210 and 220 associated with different networks.

Beginning with the second network node 220, it includes a database 222, a provisioning component 224, a selection criteria component 226, and a policy control component 228. The provisioning component 224 interfaces with the provisioning system 230 in order to provision a new subscription to a service that provides access to a telecommunications network. The subscription may be associated with one or more persons (e.g., "subscribers") and one or more mobile devices. Features of the subscription may include capabilities (e.g., capabilities regarding VoLTE, 5G, IPv6-only, standalone 5G, and others), device models, plan tiers, carriers and/or service providers, payment types (e.g., pre-paid, post-paid), SIM type, and many other features. These features may be defined as selection criteria attributes in the database 222 and may be populated there based on the interfacing between the provisioning system 230 and the provisioning component 224. Provisioning and the associated steps described herein may be triggered when a subscriber purchases and activates a new mobile device, such as mobile device 202, for example.

The selection criteria component 226 interfaces with the selection criteria update system 240 to determine selection criteria and associated rules. As used herein, "selection criteria" refers to one or more criteria utilized to select subscriptions that are subject to a service policy. Depending on whether an attribute for a particular subscription satisfies the selection criteria, a rule determines what service policy applies to that subscription. For example, the selection criteria may be, "all new phones of a certain brand having 5G capabilities," and the associated rule or policy for subscriptions satisfying that criteria may be, "provide higher quality of service for data access on all 5G, LTE, and 3G networks." The selection criteria update system 240 may provide the selection criteria and/or the associated rules to the selection criteria component 226. The selection criteria component 226 may communicate with the provisioning component 224, as well as other network components, to provision a new subscription in accordance with the policy. For example, when the provisioning component 224 receives an indication to provision a new subscription, the selection criteria component 226 may read the selection criteria provided by the selection criteria update system 240 and compare such selection criteria against selection criteria attributes for the new subscription. If the selection criteria attributes for the new subscription satisfy the selection criteria (e.g., the selection criteria attributes for mobile device 202 indicate it is the specified brand and has 5G capabilities), then the service policy for that subscription provides a higher quality of service for data access on all 5G, LTE, and 3G networks. This service policy may be stored at database 222 in association with an identifier for the subscription.

Subsequent to provisioning, when mobile device 202 accesses the network 200 via the second network node 220, the policy control component 228 will enforce the service policy. For example, mobile device 202 will receive a higher quality of service for data access on all 5G, LTE, and 3G networks.

The selection criteria update system 240 may periodically update selection criteria, and this may trigger updates to the service policy information stored at database 222. This allows a network operator to refine selection criteria over time. For instance, in the context of upgrading a network and slowly rolling out the new technology to expanding groups of subscribers, the selection criteria update system 240 may initially define selection criteria such that new devices on a high-tier plan start receiving services on the new network and stop receiving services on the old network. Once that transition has been made successfully, the network operator may cause the selection criteria update system 240 to expand the selection criteria to include older devices and/or different tiers of plans. Additionally, if the transition for one group of subscribers encounters problems, the implementation can be adjusted so that subsequent groups of subscribers do not encounter the same problem. The selection criteria update system 240 may also specify override criteria such that specific subscriptions are not subject to the general policy enforcement (e.g., enterprise accounts, government accounts, first responders). Thus, selection criteria and an associated policy may take the form of a general rule, subject to a list of exceptions. Subscriptions may be grouped and selected based on various attributes such that service policy rollout may be customized in any number of ways. This facilitates gradual transitions in service policies, as well as override criteria for exempting certain subscriptions, so as to minimize impact on subscribers during the transition. In the context of a network upgrade, this allows a network operator to seamlessly transition away from, and eventually shut down, the older technology network, which reduces capital and operational expenses. Outside of the context of a network upgrade, aspects of the technology described herein facilitate consistent policy enforcement across networks, even when such networks lack access to the same selection criteria attributes used to define the relevant service policies.

Turning now to the first network node 210, it includes a database 212, a provisioning component 214, a query component 216, and a policy control component 218. The provisioning component 214 interfaces with the provisioning system 230 in order to provision a new subscription. In some aspects, this is similar to the discussion above with respect to the second network node 220 and its provisioning component 224. For example, such provisioning may be triggered when a subscriber purchases and activates a new mobile device, such as mobile device 202. Differences may arise, however, in the selection criteria attributes that are populated in the databases of the different nodes and/or the initial service policy that is defined. The selection criteria attributes populated at the first network node 210 may be different from and/or fewer than the selection criteria attributes populated at the second network node 220. This may occur in the context of older and newer technology types, different generations of the same technology type, and/or different technology types. Accordingly, the selection criteria attributes noted in the example above (e.g., the specified phone brand and 5G capabilities) may be unavailable at the first network node 210, and the first network node 210 therefore cannot utilize selection criteria attributes to determine the relevant service policy (e.g., whether a higher quality of service is to be provided). The subscription may be provisioned with an initial service policy, which may then be updated to reflect the service policy that is based on selection criteria, as described below.

To determine the updated service policy, the query component 216 communicates a query to the second network node 220 (e.g., queries the database 222 of the second network node 220) using a subscription identifier that is common to both nodes 210 and 220. Subscription identifiers may include any identifier that can be used to identify a subscription, a subscriber, and/or a device. Examples include International Mobile Subscriber Identity (IMSI), Globally Unique Temporary Identifier (GUTI), Subscription Permanent Identifier (SUPI), Subscription Concealed Identifier (SUCI), Mobile Subscriber International Subscriber Directory Number (MSISDN), Mobile Directory Number (MDN), Mobile Station ID (MSID), Business Account Number (BAN), IP Address, User Equipment ID (UE ID), Integrated Circuit Card ID (ICCID), phone number, and many others. Different networks utilize such identifiers for purposes of subscription identification, billing, network operability and interoperability, and other functions. As used herein, a "common identifier" may refer to an identifier that is used by both the first network node 210 and the second network node 220, and/or it may refer to a first identifier that is utilized by the first network node 210 and that corresponds to a second identifier that is utilized by the second network node 220. For example, the second identifier may be derived from the first identifier, such as by querying a database using the first identifier and receiving the second identifier as an output. The identifier may be the same but have different names in different networks and/or it may be extractable.

Based on the query from the query component 216 that comprises a common subscription identifier associated with the subscription for the mobile device 202, the second network node 220 determines a service policy for the relevant subscription and provides service policy information to the first network node 210. The service policy was determined by the second network node 220 based on selection criteria and selection criteria attributes, as discussed above.

The first network node 210 receives the service policy information and updates its database 212 to reflect the service policy for the particular subscription (prior to this update, the database 212 may have reflected an initial service policy indicated by the provisioning system 230, as discussed above). Subsequently, when mobile device 202 accesses the network 200 via the first network node 210, the policy control component 218 will enforce the updated service policy. For example, mobile device 202 will receive a higher quality of service for data access on all 5G, LTE, and 3G networks. In this way, the same service policy, which is based on selection criteria attributes regarding device brand and 5G capabilities, will be consistently enforced across network nodes 210 and 220, even though the relevant selection criteria attributes are unavailable at the first network node 210.

In terms of timing, the provisioning activities at the first network node 210 and the second network node 220 may be triggered by the activation of the new mobile device 202, among other things. Thus, the provisioning on both nodes may occur at similar times. The process by which the first network node 210 queries the second network node 220 and retrieves service policy information for a particular subscription may occur asynchronously. For example, each time a new subscription is provisioned at the first network node 210, the first network node 210 may wait a predefined period of time (e.g., 30 seconds to 2 minutes), and may then query the second network node 220 using a common subscription identifier for the new subscription. The predefined period of time is configurable and may thus be defined to be any increment. Additionally or alternatively, the first network node 210 may keep track of all new subscription identifiers. At fixed time intervals, the first network node 210 may query the second network node 220 for all new subscription identifiers that were added since the last query. Additionally or alternatively, the first network node 210 may include subscription identifiers that were submitted in previous queries in order to capture any updated service policies based on updated selection criteria since the last query.

The policy enforcement activities may be triggered by a mobile device attaching to either the first network node 210 or the second network node 220 in order to access services via the network 200. The relevant network node refers to its database to determine the appropriate service policy and enforces such policy. For example, when any one of mobile devices 202, 204, 206, and 208 is attached to the first network node 210, the node 210 may refer to its database 212 to determine a service policy associated with the particular subscription and then provide service in accordance with such policy. When the same mobile device moves to a different geographic location and attaches to the second network node 220, the node 220 may refer to its database 222 to determine a service policy associated with the particular subscription and then provide service in accordance with such policy. As described, aspects of the present disclosure ensure that different nodes utilize the same service policy and thus provide consistent policy enforcement.

The preceding description is provided in the context of provisioning a new subscription. It will be understood, however, that the technology described herein may also be used to backfill existing subscriptions. For example, the first network node 210 may query the second network node 220 utilizing common identifiers for existing subscriptions. This could be performed at any desired time interval in order to update service policy information for existing subscriptions. Furthermore, these steps for updating service policy information at the first network node 210 may be performed periodically to ensure parity across different networks at the period intervals. This may be desirable for service policies that are transient in nature throughout the life of the subscription (although some service policies may persist throughout the life of a subscription). Additionally or alternatively, the steps for updating service policy information at the first network node 210 may be triggered by various events, such as subscription updates or other events for which it would be desirable to recheck and reapply service policy information.

It will be understood that the selection criteria and service policies described above are exemplary only. Many other criteria and policies are included within the scope hereof. For example, service policies may specify max uplink or downlink bandwidths, or may provide free services (e.g., music streaming) for subscriptions satisfying certain criteria. Another example includes stopping a certain type of service or access for certain subscribers, such as stopping SMS access using older technology for subscriptions that have SMSoIP capabilities. In addition to the examples discussed above, selection criteria may refer to a particular model of phone, a particular model of phone belonging to a particular plan, a particular model of phone belonging to a particular operator brand and subscribing to a plan having a particular price point, subscriptions associated with SIMs that support IMS, and any number of other criteria.

Figure 3:
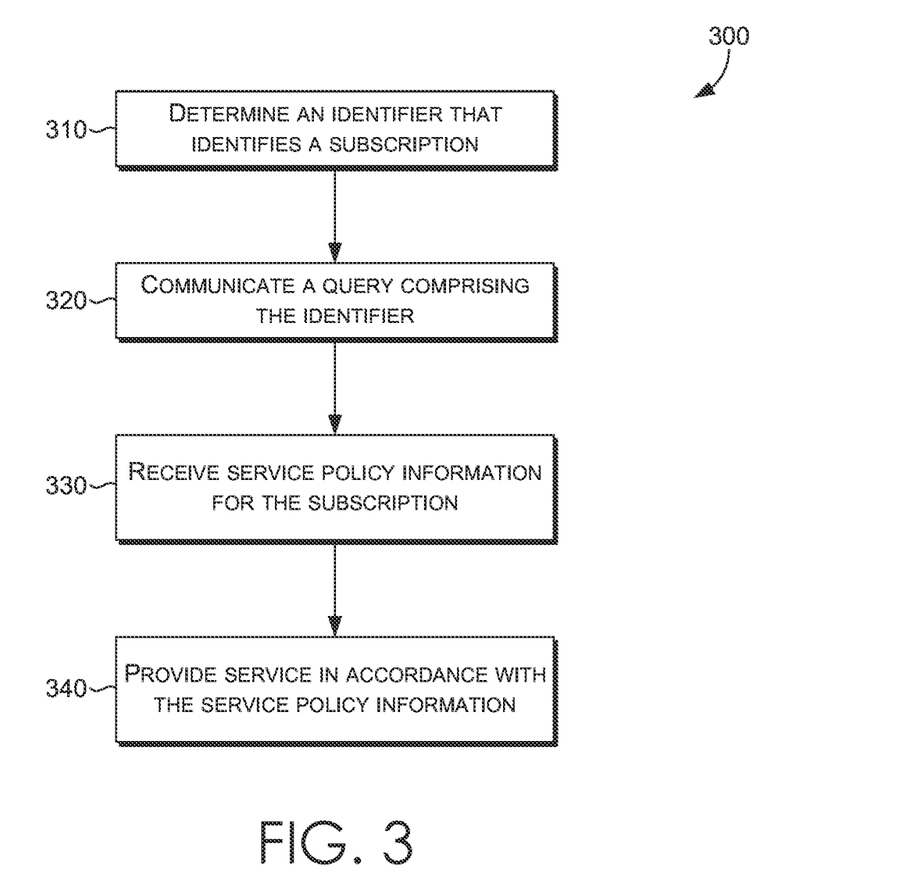
FIGS. 3-5 depict flow diagrams of exemplary methods for providing consistent policy enforcement across networks, in accordance with aspects of the technology described herein.
Figure 4:
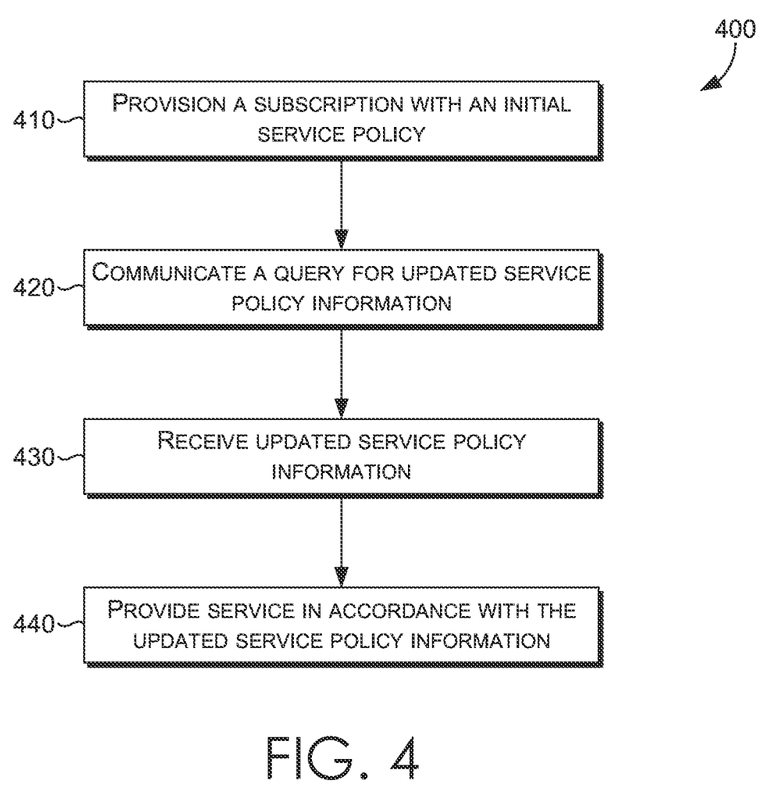
Figure 5:
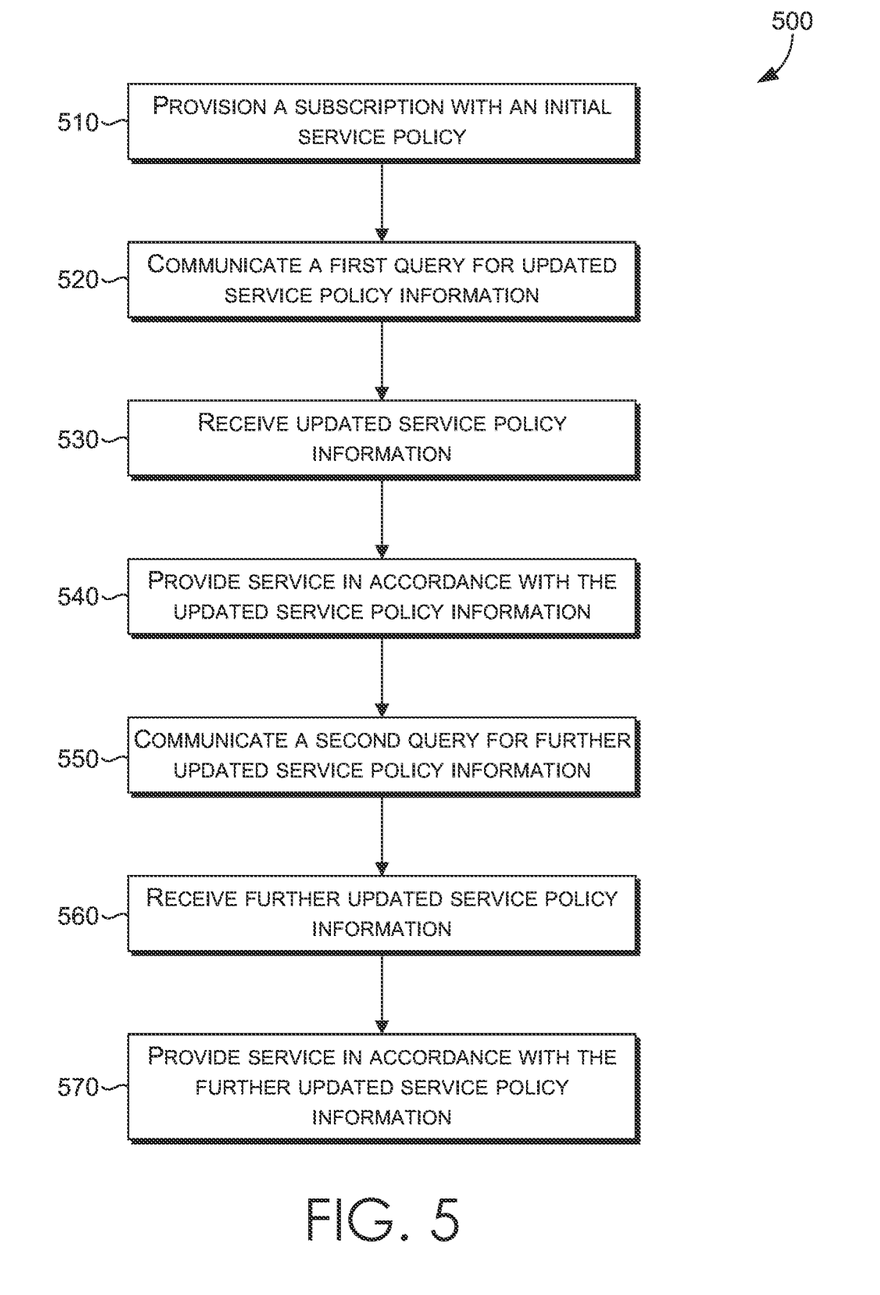

Turning now to FIGS. 3-5, flow diagrams of exemplary methods are provided. Beginning with FIG. 3, a flow diagram of an exemplary method 300 for providing consistent policy enforcement across networks is provided. The steps may be performed by one or more components of a first network node, such as node 210 of FIG. 2. At block 310, an identifier that identifies a subscription is determined. The identifier is common to at least two networks. In other words, the identifier identifies a subscription in a first network and corresponds to an identifier that identifies the same subscription in a second network. The second identifier may be retrieved from a database using the first identifier. The identifier may be determined by a component of the first network node, such as the query component 216 of the first network node 210 in FIG. 2.

At block 320, a query comprising the identifier is communicated from the first network node to a second network node, such as node 220 of FIG. 2. The query may include a request for service policy information for the subscription associated with the identifier, and the query may thus include the identifier determined at block 310. The query communication may be performed by a component of the first network node, such as the query component 216 of the first network node 210 in FIG. 2.

At block 330, service policy information for the subscription is received in response to the query. This response may be received by a component of the first network node, such as the query component 216 of the first network node 210 in FIG. 2. The service policy information that is received may be determined by the second network node based on a selection criteria attribute that is unavailable at the first network node. For example, the service policy information may be determined by the second network node based on the selection criteria attribute satisfying selection criteria. The selection criteria attribute may include at least one of a device model, device capability, carrier identification, plan tier, payment type, or SIM type. In addition to the selection criteria attribute, the service policy information may also be determined by the second network node based on override criteria. Similar to the selection criteria attribute, the override criteria may be unavailable at the first network node. The override criteria may include at least one of an enterprise subscription, a government subscription, or a first responder subscription. The service policy information may define at least one of a type of service or a quality of service for the subscription. The service policy information may be determined by a component of the second network node, such as the selection criteria component 226 of the second network node 220 in FIG. 2.

At block 340, the first network node provides service to a device associated with the subscription (e.g., device 202) in accordance with the service policy information. A component of the first network node, such as the policy control component 218 of the first network node 210 in FIG. 2, may enforce the policy. A component of the second network node, such as the policy control component 228 of the second network node in FIG. 2, may enforce the same service policy. The method illustrated in FIG. 3 may thus facilitate consistent policy enforcement across the two nodes.

Turning now to FIG. 4, a flow diagram of an exemplary method 400 for providing consistent policy enforcement across networks is provided. The steps may be performed by one or more components of a first network node, such as node 210 of FIG. 2. At block 410, a subscription is provisioned with an initial service policy. This may be performed, in part, by a component of the first network node, such as the provisioning component 214 of the first network node 210 in FIG. 2.

At block 420, the first network node queries a second network node, such as node 220 of FIG. 2, for updated service policy information. The query may include a subscription identifier that identifies the relevant subscription at both the first and second nodes. The query may be communicated a predefined amount of time after provisioning the subscription. The predefined amount of time may be between 30 seconds and 2 minutes, or any other amount of time. The query communication may be performed by a component of the first network node, such as the query component 216 of the first network node 210 in FIG. 2.

At block 430, in response to the query, updated service policy information for the subscription is received. The information may be received by a component of the first network node, such as the query component 216 of the first network node 210 in FIG. 2, and saved in a database at the node (e.g., it may replace the initial service policy), such as database 212 in FIG. 2. The updated service policy information is determined by the second network node based on a selection criteria attribute for the subscription satisfying selection criteria. The selection criteria and/or the selection criteria attribute may be unavailable at the first network node. The service policy information may be determined by a component of the second network node, such as the selection criteria component 226 of the second network node 220 in FIG. 2.

At block 440, the first network node provides service to a device associated with the subscription (e.g., device 202) in accordance with the updated service policy information. A component of the first network node, such as the policy control component 218 of the first network node 210 in FIG. 2, may enforce the policy. A component of the second network node, such as the policy control component 228 of the second network node in FIG. 2, may enforce the same service policy. The method illustrated in FIG. 4 may thus facilitate consistent policy enforcement across the two nodes.

Turning now to FIG. 5, a flow diagram of an exemplary method 500 for providing consistent policy enforcement across networks is provided. The steps may be performed by one or more components of a first network node, such as node 210 of FIG. 2. At block 510, a subscription is provisioned with an initial service policy. This may be performed, in part, by a component of the first network node, such as the provisioning component 214 of the first network node 210 in FIG. 2.

At block 520, the first network node queries a second network node, such as node 220 of FIG. 2, for updated service policy information. The query may include a subscription identifier that identifies the relevant subscription at both the first and second nodes. The query may be communicated a predefined amount of time after provisioning the subscription. The predefined amount of time may be between 30 seconds and 2 minutes, or any other amount of time. The query communication may be performed by a component of the first network node, such as the query component 216 of the first network node 210 in FIG. 2.

At block 530, in response to the query, updated service policy information for the subscription is received. The information may be received by a component of the first network node, such as the query component 216 of the first network node 210 in FIG. 2, and saved in a database at the node (e.g., it may replace the initial service policy), such as database 212 in FIG. 2. The updated service policy information is determined by the second network node based on a selection criteria attribute for the subscription satisfying selection criteria. The selection criteria and/or the selection criteria attribute may be unavailable at the first network node. The service policy information may be determined by a component of the second network node, such as the selection criteria component 226 of the second network node 220 in FIG. 2.

At block 540, the first network node provides service to a device associated with the subscription (e.g., device 202) in accordance with the updated service policy information. A component of the first network node, such as the policy control component 218 of the first network node 210 in FIG. 2, may enforce the policy. A component of the second network node, such as the policy control component 228 of the second network node in FIG. 2, may enforce the same service policy. Accordingly, the first network node and the second network node are in parity.

At block 550, subsequent to receiving the updated service policy information, the first network node communicates a second query to the second network node. The first network node receives further updated service policy information for the subscription in response to the second query at block 560. The further updated service policy information is determined by the second network node based on the selection criteria attribute for the subscription satisfying updated selection criteria. The number of subscriptions having a selection criteria attribute that satisfies the updated selection criteria may be greater than a number of subscriptions having a selection criteria attribute that satisfies the selection criteria (e.g., the updated selection criteria may encompass a larger number of subscriptions and thus facilitate roll out of a particular policy to more subscriptions). The updated selection criteria may be specified by another network component, such as the selection criteria update system 240 of FIG. 2. The further updated service policy information may be determined by a component of the second network node, such as the selection criteria component 226 of the second network node 220 in FIG. 2. The query communication may be performed by a component of the first network node, such as the query component 216 of the first network node 210 in FIG. 2.

At block 570, the first network node provides service to a device associated with the subscription (e.g., device 202) in accordance with the further updated service policy information. A component of the first network node, such as the policy control component 218 of the first network node 210 in FIG. 2, may enforce the policy. A component of the second network node, such as the policy control component 228 of the second network node in FIG. 2, may enforce the same policy. Accordingly, the first network node and the second network node are again in parity following the update to the selection criteria.

Referring to FIG. 6, a diagram is depicted of an exemplary computing environment suitable for use in implementations of the present disclosure. In particular, the exemplary computer environment is shown and designated generally as computing device 600. Computing device 600 is but one example of a suitable computing environment and is not intended to suggest any limitation as to the scope of use or functionality of the technology described herein. Neither should computing device 600 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 6, computing device 600 includes bus 610 that directly or indirectly couples the following devices: memory 612, one or more processors 614, one or more presentation components 616, input/output (I/O) ports 618, I/O components 620, and power supply 622. Bus 610 represents what may be one or more busses (such as an address bus, data bus, or combination thereof). Although the devices of FIG. 6 are shown with lines for the sake of clarity, in reality, delineating various components is not so clear, and metaphorically, the lines would more accurately be grey and fuzzy. For example, one may consider a presentation component such as a display device to be one of I/O components 620. Also, processors, such as one or more processors 614, have memory. The present disclosure hereof recognizes that such is the nature of the art, and reiterates that FIG. 6 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 6 and refer to "computer" or "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer-storage media in the form of volatile and/or nonvolatile memory. Memory 612 may be removable, nonremovable, or a combination thereof. Exemplary memory includes solid-state memory, hard drives, optical-disc drives, etc. Computing device 600 includes one or more processors 614 that read data from various entities such as bus 610, memory 612 or I/O components 620. One or more presentation components 616 presents data indications to a person or other device. Exemplary one or more presentation components 616 include a display device, speaker, printing component, vibrating component, etc. I/O ports 618 allow computing device 600 to be logically coupled to other devices including I/O components 620, some of which may be built in computing device 600. Illustrative I/O components 620 include a microphone, joystick, game pad, satellite dish, scanner, printer, wireless device, etc.

Radio 624 represents a radio that facilitates communication with a wireless telecommunications network. Illustrative wireless telecommunications technologies include CDMA, GPRS, TDMA, GSM, and the like. Radio 624 might additionally or alternatively facilitate other types of wireless communications including Wi-Fi, WiMAX, LTE, or other VoIP communications. As can be appreciated, in various embodiments, radio 624 can be configured to support multiple technologies and/or multiple radios can be utilized to support multiple technologies. A wireless telecommunications network might include an array of devices, which are not shown so as to not obscure more relevant aspects of the technology described herein. Components such as a base station, a communications tower, or even access points (as well as other components) can provide wireless connectivity in some embodiments.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A system comprising:
one or more processors; and
one or more computer storage devices storing computer-useable instructions that, when executed by the one or more processors, cause the system to perform operations comprising:
determining a first identifier that identifies a subscription in a database of a first network node and that corresponds to a second identifier that identifies the subscription in a database of a second network node,
communicating a query from the first network node to the second network node, the query comprising a request for service policy information and including at least one of the first identifier or the second identifier,
receiving, at the first network node, the service policy information for the subscription in response to the query, wherein the service policy information is determined by the second network node based on a selection criteria attribute that is unavailable at the first network node, and at the first network node, providing service to a device associated with the subscription in accordance with the service policy information.

2. The system of claim 1, wherein the computer-useable instructions further cause the system to perform operations comprising:

provisioning the subscription at the first network node with an initial service policy, and updating the initial service policy based on the service policy information received in response to the query.

3. The system of claim 2, wherein the query is communicated from the first network node to the second network node at a predefined interval after provisioning the subscription, wherein the predefined interval is between 30 seconds and 2 minutes.

4. The system of claim 2, wherein the service policy information is determined by the second network node based on the selection criteria attribute satisfying selection criteria.

5. The system of claim 4, wherein the computer-useable instructions further cause the system to perform operations comprising:

subsequent to updating the initial service policy, communicating a second query from the first network node to the second network node, the second query comprising at least one of the first identifier or the second identifier, receiving, at the first network node, further updated service policy information for the subscription in response to the query, wherein the further updated service policy information is determined by the second network node based on the selection criteria attribute satisfying updated selection criteria, and providing service to the device in accordance with the further updated service policy information.

6. The system of claim 1, wherein the service policy information is determined by the second network node based on override criteria in addition to the selection criteria attribute.

7. The system of claim 1, wherein the service policy information defines at least one of a type of service or a quality of service for the subscription.

8. The system of claim 1, wherein the selection criteria attribute comprises at least one of a device model, device capability, carrier identification, plan tier, payment type, or SIM type.

9. A computerized method for consistent policy enforcement across networks, the method comprising:

at a first network:

provisioning a subscription with an initial service policy;

a predefined amount of time after provisioning the subscription, querying a second network for updated service policy information, the query comprising a subscription identifier;

in response to the query, receiving the updated service policy information for the subscription, wherein the updated service policy information is determined by the second network based on a selection criteria attribute for the subscription satisfying selection criteria, and wherein the selection criteria attribute is unavailable at the first network; and providing service to a device associated with the subscription in accordance with the updated service policy information.

10. The method of claim 9, wherein the query is communicated from the first network to the second network at a predefined interval after provisioning the subscription.

11. The method of claim 9, further comprising:

subsequent to receiving the updated service policy information, communicating a second query from the first network to the second network, receiving, at the first network, further updated service policy information for the subscription in response to the second query, wherein the further updated service policy information is determined by the second network based on the selection criteria attribute for the subscription satisfying updated selection criteria, and providing service to the device in accordance with the updated service policy information.

12. The method of claim 11, wherein a number of subscriptions having a selection criteria attribute that satisfies the updated selection criteria is greater than a number of subscriptions having a selection criteria attribute that satisfies the selection criteria.

13. The method of claim 9, wherein the updated service policy information defines at least one of a type of service or a quality of service for the subscription.

14. The method of claim 9, wherein the selection criteria attribute comprises at least one of a device model, device capability, carrier identification, plan tier, payment type, or SIM type.

15. A computerized method comprising:

at a network node in a first network:

determining a first identifier that identifies a subscription in the first network and that corresponds to a second identifier that identifies the subscription in a second network;

communicating a query to the second network, the query comprising at least one of the first identifier or the second identifier;

in response to the query, receiving service policy information for the subscription, wherein the service policy information is determined by the second network based on a selection criteria attribute that is unavailable at the first network; and providing service to a device associated with the subscription in accordance with the service policy information.

16. The method of claim 15, wherein the second identifier is retrieved from a database using the first identifier.

17. The method of claim 15, wherein the service policy information defines at least one of a type of service or a quality of service for the subscription.

18. The method of claim 15, wherein the service policy information is determined by the second network based on override criteria in addition to the selection criteria attribute.

19. The method of claim 18, wherein the override criteria are unavailable at the first network.

20. The method of claim 19, wherein the override criteria comprise at least one of an enterprise subscription, a government subscription, or a first responder subscription.

* * * * *